March 22, 1960   W. O. PASSARELLI, JR., ET AL   2,929,250
ELECTROMAGNETIC CONTROL DEVICE
Filed Aug. 12, 1957   5 Sheets-Sheet 2

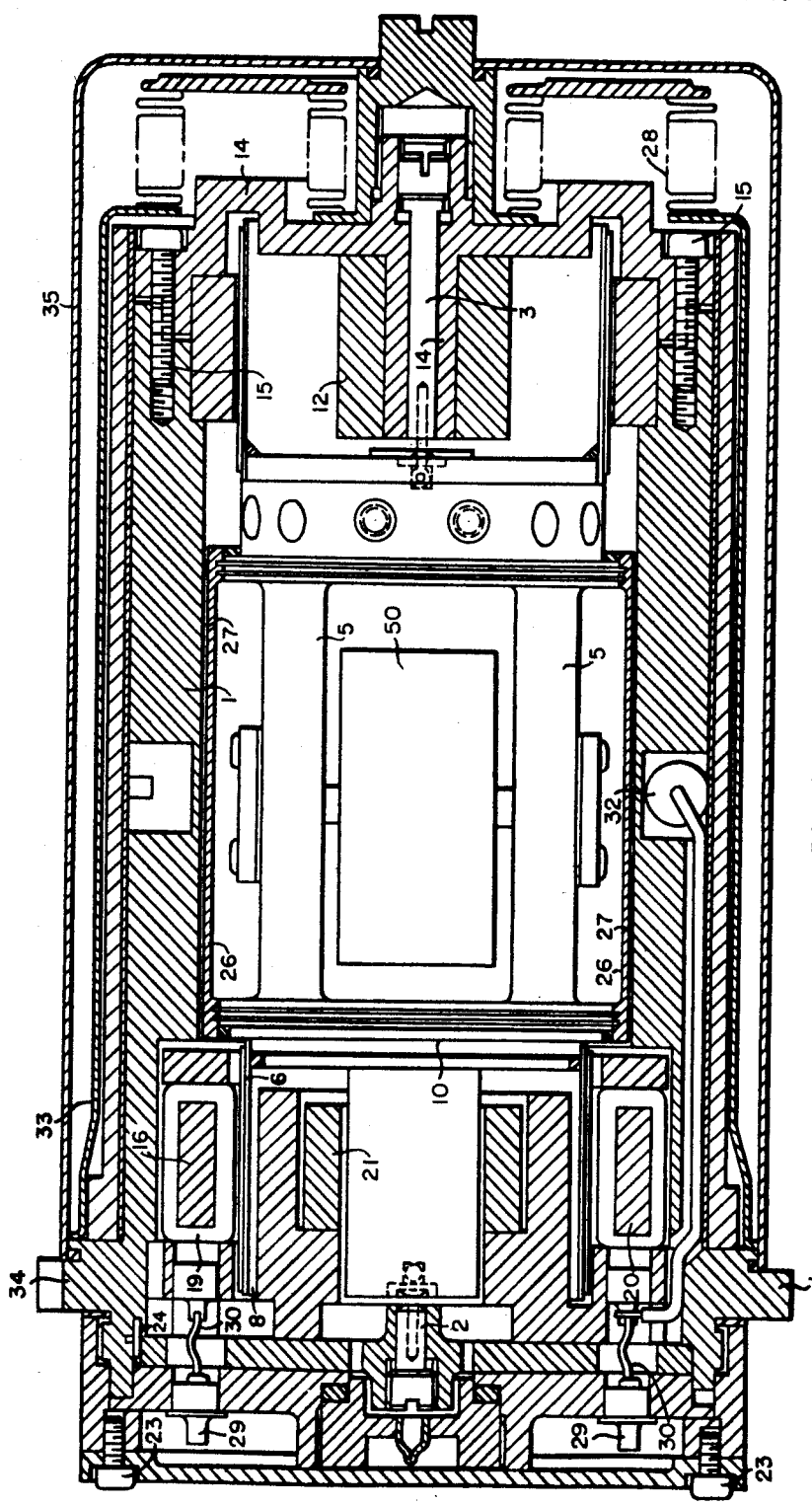

United States Patent Office 2,929,250
Patented Mar. 22, 1960

2,929,250
ELECTROMAGNETIC CONTROL DEVICE

William O. Passarelli, Jr., Baltimore, and Samuel Wolf, Linthicum Heights, Md., assignors to Westinghouse Electric Corporation, East Pittsburgh, Pa., a corporation of Pennsylvania Application August 12, 1957, Serial No. 677,696

12 Claims. (Cl. 74—5.6)

This invention relates to an electromagnetic control device and, more particularly, to a device capable of being controlled through electrical impulses received by a torque motor associated therewith and providing electrical impulses indicating the amount of displacement of said device in response to any input signals.

Devices of the nature hereinafter described have basically been used as integrating accelerometers operable in closed loop systems or a rate of change device for an aircraft or other space traveling device. Devices of this nature have generally used electrical input and output signals for effecting the control function. The circuit for utilizing the input signal and for developing an output signal generally involves a torque motor input structure and a transducer output structure. Both the input and output moving structures generally comprise a magnetizing member and magnetic iron capable of providing a low reluctance flux path for each. In order to maintain accurate readings proportional to input and output signals, it has been necessary in the past to provide for rotation or deflection of a portion of the magnetic structure involved in the input and output circuits. Structures of this nature, however, introduces accuracy problems due to large inertia of the rotating mass, residual magnetism within the magnetic structure of the rotating mass and the introduction of lateral forces capable of causing greater friction in the support bearings for the rotating mass.

It is, therefore, an object of this invention to provide a transducer and torque motor capable of rapid response and accurate control directly proportional to input displacements and control signals, respectively.

Another object of the invention is to provide a transducer and torque motor that is free from high inertia due to rotation of heavy magnetic structure.

It is another object of this invention to provide a transducer and torque motor capable of being free of displacement due to rotating mass residual magnetism.

It is another object of this invention to provide a structure that is simple to assemble and insensitive to minor axial and radial misalignment.

It is another object of this invention to provide a torque motor and position detector utilizing only a single stationary magnetic flux developing circuit.

It is another object of this invention to provide a transducer and torque motor that is conducive to compact structure through its mechanical arrangement.

Other objects, purposes and characteristic features will become clear as the description progresses.

In practicing this invention, there is provided an electromagnetic device comprising a position detector and torque motor control capable of readily allowing the device to be used as a direct rate of change detector in a rate loop or in an integrating loop system, such as that used as inertial guidance. The device comprises a stator portion capable of providing flux to be utilized by the position detector and torque motor components. The rotor of the device comprises coils positioned on non-magnetic structure of very light weight material and positioned to pass through the field developed by the stator flux generating means. The structure provides for the complete flux generating and flux return paths of the torque motor and position detector portions of the device to be completely supported by the stator portion of the device.

Fig. 7 is a view similar to Fig. 1 of an accelerometer utilizing the structure of this invention.

In each of the several views similar parts bear like reference characters.

Figure 1:
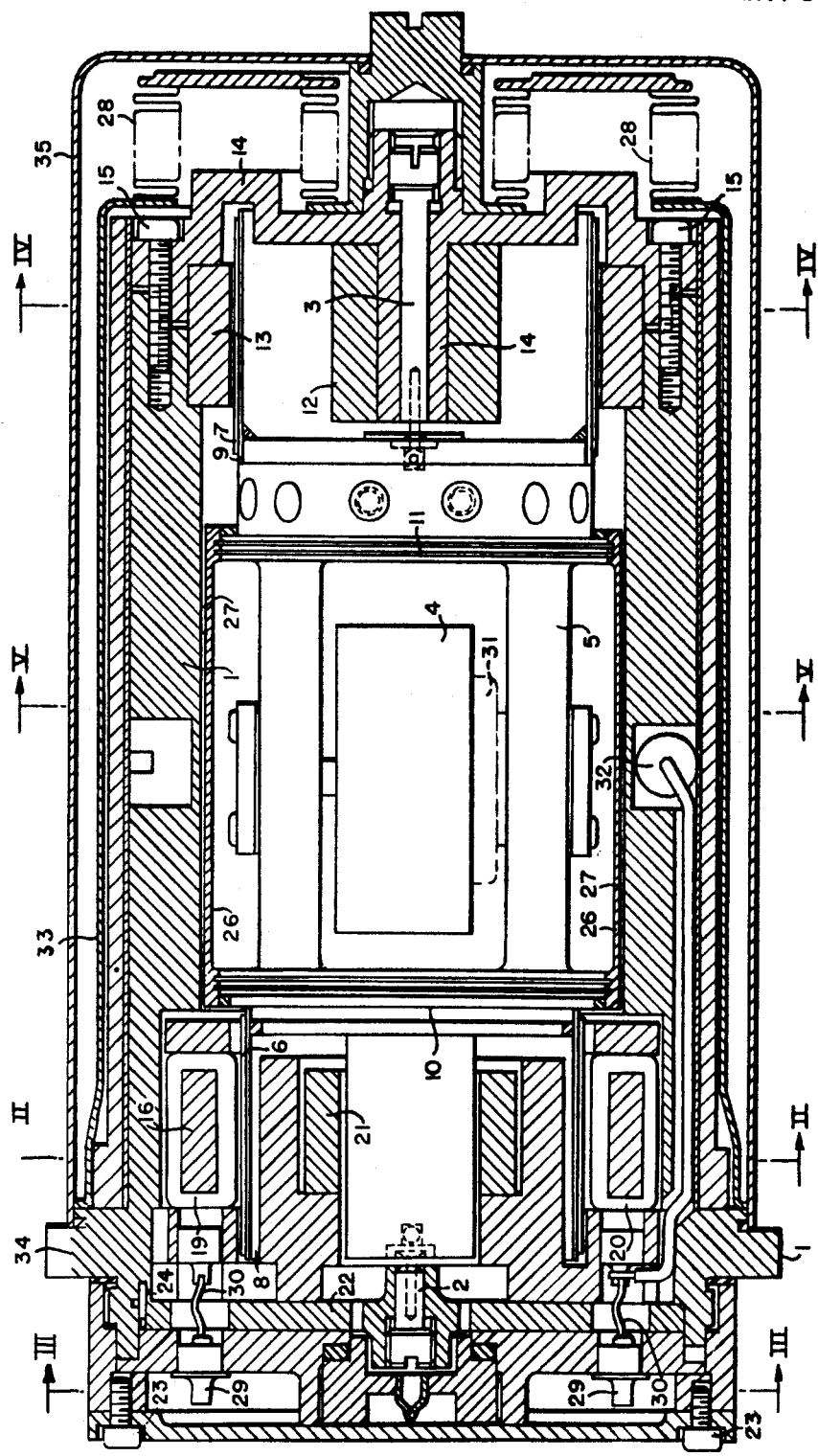
Figure 1 is a view of one embodiment of this invention showing the stator supported flux generating structure and the rotor supported torque motor and position detector structures positioned on opposite sides of a control gyro.

The structure shown in Fig. 1 comprises a frame member or shell 1 provided with a pair of jeweled bearings 2 and 3 capable of supporting a gyro 4 and its associated gimbal 5 for movement about the jeweled bearings 2 and 3 within the supporting frame member 1. Positioned about the pivot axis of the gimbal 5 on opposite sides of the gyro 4 are the control coils 6 and 7. The control coils 6 and 7 are supported on light weight non-magnetic coil forms 8 and 9, respectively. The coil forms 8 and 9 are cylindrical in shape and secured to a support ring 10 and 11, respectively, forming a structure integral with the gimbal 5.

Figure 4:
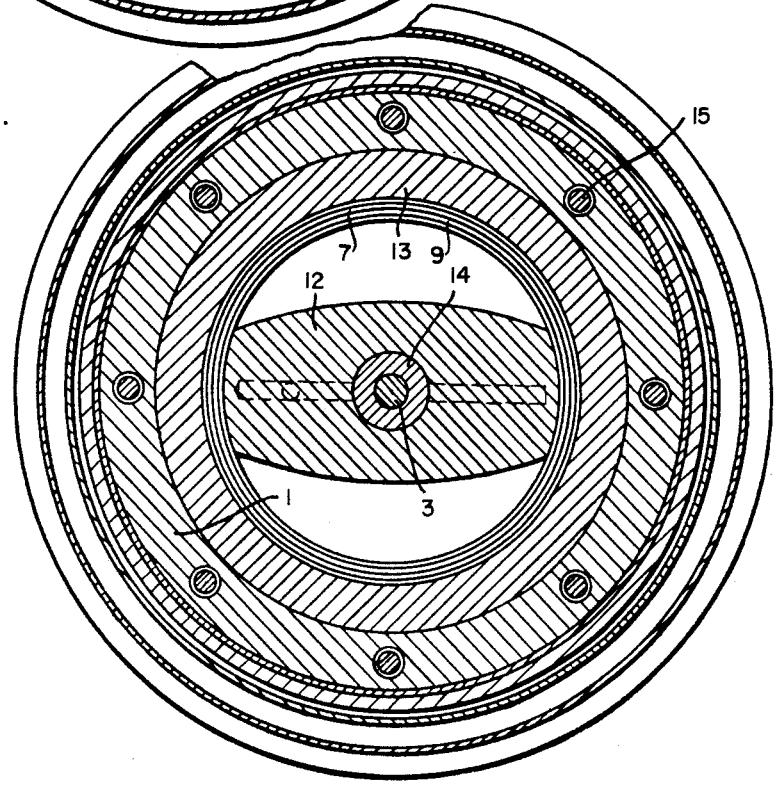
Fig. 4 is a cross-sectional view taken along the line IV—IV of Fig. 1.

The coil 7, in cooperation with the magnetic structure comprising a permanent magnet 12 and flux return ring 13, form a control torque motor, see Fig. 4. It can be seen by Fig. 4 that the permanent magnet 12 is supported about the circular support pin 14 supported on the frame member 1. The support pin 14 also houses the jeweled bearing 3 for the gyro gimbal 5. Likewise, the return path flux ring 13 is shown secured in place within the frame member 1 by the end cap and support pin 14 which is in turn secured to the frame member 1 by suitable screws 15. The size of the permanent magnet 12 is arranged to be of sufficient face width to provide for maximum deflection of the gimbal 5 about the jeweled bearings 2 and 3 without the active conductors of the coil 7 leaving the flux path set up between the permanent magnet 12 and the flux return ring 13 opposite the face of the permanent magnet 12. With uniform distribution of flux between the faces of the permanent magnet 12 and the flux return ring 13, it can be seen that movement of the gimbal 5 in response to current flow in the coil 7 is directly proportional to the amount of current flowing in the coil 7.

Figure 2:
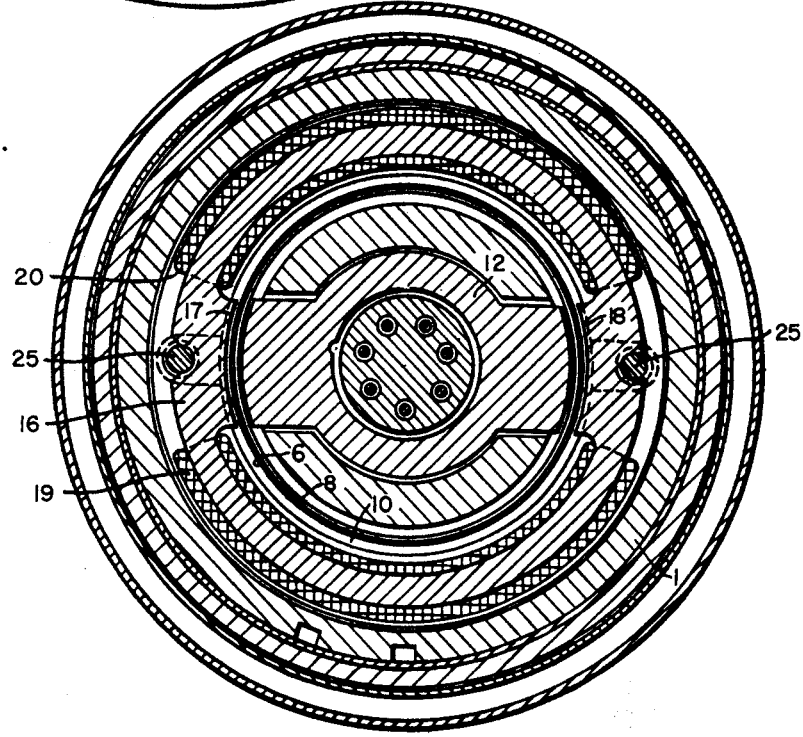
Fig. 2 is a cross-sectional view taken along the line II—II of Fig. 1.

The coil 6, like the coil 7, is supported on a cylindrical coil form 8 of light weight non-magnetic structure. The coil 6, Fig. 2, is also provided with a stator supported flux generating means comprising a flux ring 16 provided with a pair of inwardly projecting pole faces 17 and 18 positioned to provide only mechanical clearance with the coils 6. The flux ring 16 is also provided with a pair of windings 19 and 20 positioned on opposite sides of the pole faces 17 and 18. It is the purpose of the windings 19 and 20 to set up a flux field to be utilized by the position detector coils 6. Positioned within the coil form 8 supporting the coil 6 in a path directly between the pole faces 17 and 18 is a low reluctance magnetic flux path member 21. The magnetic flux path member 21 is constructed of the length capable of extending substantially the entire internal diameter of the coil form 8, with the exception of sufficient clearance to allow free rotation of the coil form 8.

The turns of the position detector coil 6, like those of the coil 7, are positioned with active conductors under the pole faces 17 and 18 throughout the complete motion of the gimbal 5. Here again, with the flux density being uniform across the pole faces 17 and 18 and with the active conductors of the coil 6 being always positioned under the pole faces 17 and 18, the output signal from the coil 6 will always be directly proportional to the flux linked by the coil 6.

It is pointed out that the low reluctance flux return path member 21 is secured to the end bell 22 (Fig. 1) which is, in turn, secured to the frame member 1 by any suitable means such as the screws 23 and is further indexed to the frame member 1 by an indexing pin 24. It is also pointed out that the flux ring 16 is also secured to the frame member 1 through suitable support bolts 25, as can be seen in Fig. 2.

Figure 5:
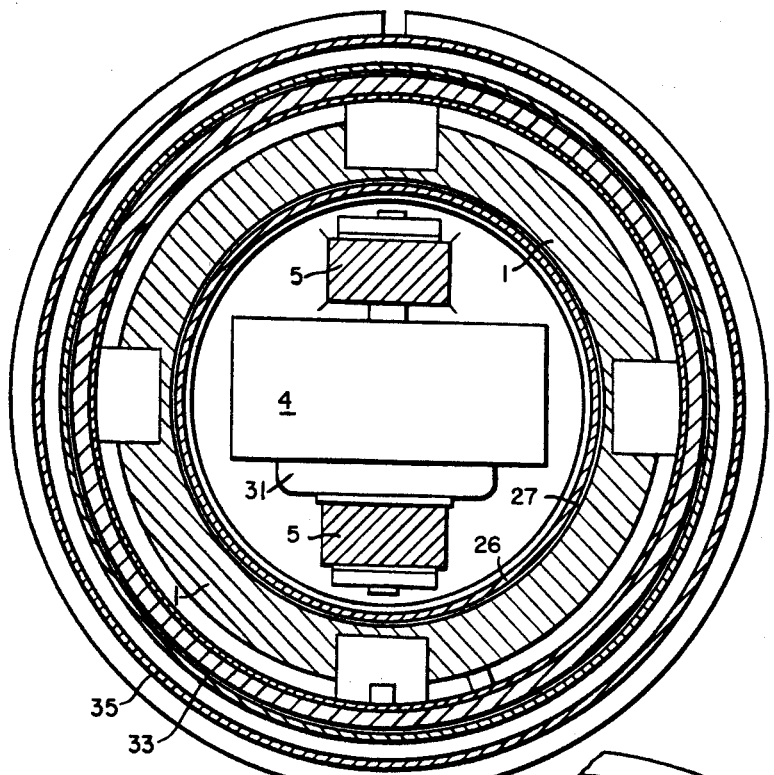
Fig. 5 is a cross-sectional view taken along the line V—V of Fig. 1.

The gimbal 5 is provided with a closure shell 26 positioned in close proximity to the frame member 1 but at the same time providing a clearance spacing 27, see Fig. 5. In order to provide viscous damping, a fluid is introduced into the space formed by the gimbal enclosure 26 and the frame member 1. This fluid provides adequate damping for eliminating output signals in response to vibrational oscillations of the gimbal 5 with respect to the frame member 1. The fluid positioned within the space 27 is provided with an expansion bellows 28 (Fig. 1) adjacent the torque motor end of the gyro for providing expansion room for the fluid during temperature changes within the gyro.

Figure 3:
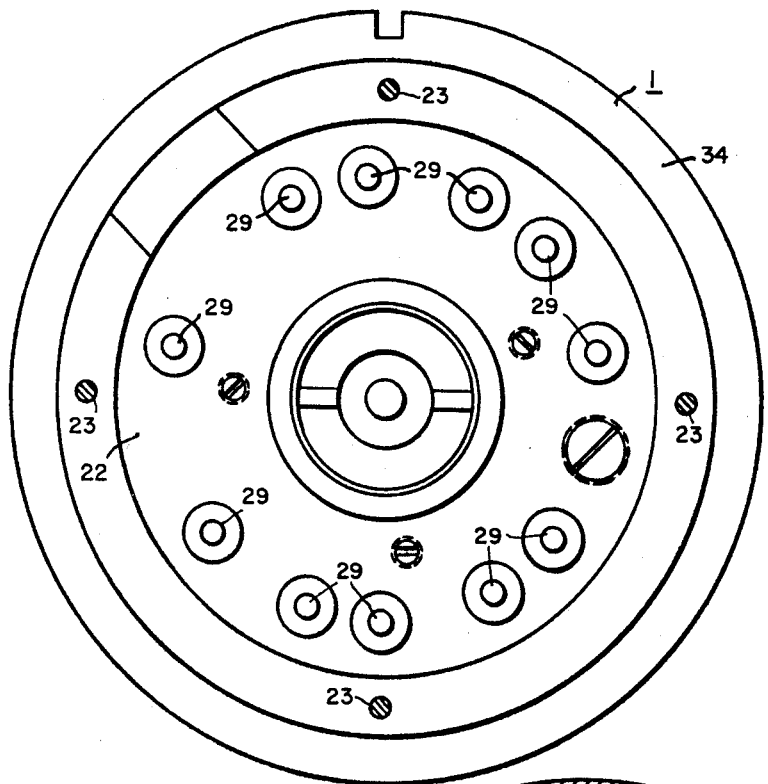
Fig. 3 is a cross-sectional view taken along the line III—III of Fig. 1.

The end bell 22 of the gyro is provided with electrical terminals 29 such as shown in Fig. 1 and Fig. 3, having flexible conductors 30, Fig. 1, for bringing the necessary electrical connections out from the drive motor 31 for the gyro 4, the flux generating windings 19 and 20 of the position detector, the lead wires for the coils 6 and 7 and for any other needs such as the thermistor 32 utilized to provide temperature correction within the gyro. The frame member 1 is provided with a fluid seal shell 33 secured to the end bell in any suitable manner, such as a mastic or brazing. The fluid seal shell 33 is cylindrical in shape and encloses the frame member 1 over its entire length from the support ring 34 to the fluid expansion bellows 28. In order to provide further protection of the fluid seal 33 and the bellows 28, a cover 35 is provided.

Operation of the gyro or accelerometer described in Fig. 1 will now be explained. If the electromagnetic device shown in Fig. 1 is used in the control of an aircraft, an output signal from the coils 6 is obtained due to a gimbal rotation. Since the rotor is provided with a rate gyro mounted thereon, a change in the path of travel of the aircraft and thus the device causes the rate gyro to introduce a displacement about the gimbal pivots 2 and 3. In response to this action, a voltage is induced in the coils 6 due to thier displacement allowing the coils to link the flux set up by the coils 19. A modification of this output can be provided by the introduction of a control current signal to the coils 7 of the torque motor. This control current signal may add or subtract from the gyro displacement of the gimbal depending upon the direction of torque motor input signal current. Current flowing in the coils 7 provides motor action due to the current flow in the coils 7 within a flux field set up by the magnet 12.

It should be pointed out that gimbal deflection can be the result of either the rate input from the gyro or the motive action from the torque motor, or both as described above.

Figure 6:
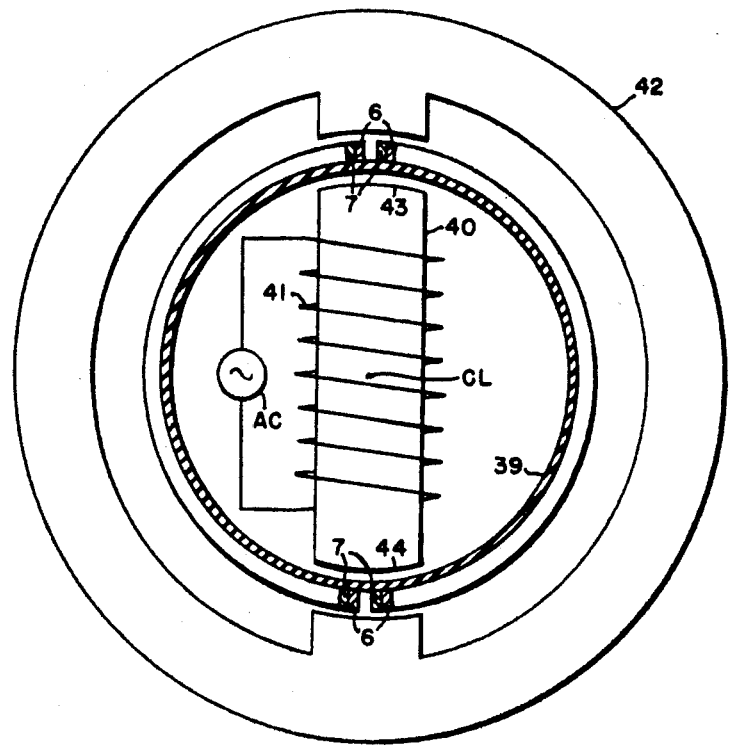
Fig. 6 is a schematic view representing another embodiment of this invention utilizing a single flux generating structure for the torque motor and position detector coils.

The structure shown in Fig. 6 is a magnetic structure for use with the torque motor and position detector coils, with the coils positioned on the same end of the gyro gimbal, such as the gyro gimbal 5 of Fig. 1. The coils 6 and 7 of the position detector and torque motor, respectively, are bifilar coils and would again be supported on a suitable coil form 39 similar to the coil forms 8 and 9 previously described in connection with Fig. 1. In this case, however, the flux generating structure for the coils 6 and 7 is a common structure utilizing the magnetic member 40 having an alternating-current flux generating winding 41 wound thereabout with the ends of the magnetic structure positioned internally of and adjacent to the coil form 39 and the coils 6 and 7. Positioned externally of the coils 6 and 7 is a low reluctance flux linking magnetic member 42 for reducing the reluctance between the pole faces 43 and 44 of the flux generating structure 40.

If we assume that suitable alternating-current voltage is supplied to the winding 41 establishing a stator flux for the coils 6 and 7 and with the coils 6 and 7 being suitably supported on a gimbal such as a gimbal 5 of Fig. 1, it can be seen that an input signal to the torque motor-coils 7 of an alternating-current nature of the proper instantaneous phase would cause a reactive force to be applied to the gimbal 5. The force then causes the gimbal 5 to rotate about its pivot points 2 and 3 of Fig. 1, or the center line indicated by CL in Fig. 6 an amount proportional to the alternating-current input signal to the coil 7. The coil 6 also being secured to the coil form 39 supporting the torque motor coil 7 is, therefore, also deflected about the center line CL. This results in the coil 6 linking a portion of the flux established by the alternating-current coil 41. The coil 6, therefore, produces an output alternating-current voltage proportional to the amount of flux linked due to the deflection dictated by the torque motor coil 7. There is also a current induced in the coils 6 directly from the coils 7. This current is degenerative, however, and is therefore not considered particularly objectionable.

This modification has several distinct advantages that can be set forth. The first distinct advantage is the inherent compactness of the structure utilizing the torque motor and position detector coils within a single flux generating path. In addition, the output and input signals from and to the coils 6 and 7 respectively are alternating voltage signals capable of direct use within well-known autopilot systems without conversion. It is also possible to maintain the rotor weight and thus its inertia to a minimum, thus providing for very rapid response to any input signals.

It is pointed out that although the coils 6 and 7 of Fig. 6 are shown and described as being supported on nonmagnetic low inertia coil forms, the coils could be mounted on movable magnetic structure with a corresponding loss of efficiency.

The modification of the invention shown in Fig. 7 is identical with the structure of Fig. 1 with the exception that the spinning gyro is replaced by a mass 50 capable of detecting angular accelerations about the pivots 2 and 3.

It should also be pointed out that the mass 50 could be located off-center to allow the accelerometer to respond to linear accelerations as well as angular accelerations.

The foregoing disclosure and showings made in the drawings are merely illustrative of the principles of this invention. It will be appreciated by those skilled in the art that this invention may be subject to modification in its details without departure from the spirit and scope of this invention.

What is claimed is:

1. A position detector and torque motor comprising stator means having flux generating means associated with a flux return means, a rotor comprising coils positioned to pass through any flux developed by said flux generating means, one of said coils providing motive action to said rotor when a control current is supplied to said one coil, another of said coils providing output currents proportional to said rotor motive action, said flux generating means and flux return means being spaced apart for receiving said rotor coils.

2. A position detector and torque motor comprising stator means having flux generating means associated with a flux return means, a rotor comprising coils positioned to pass through any flux developed by said flux generating means, one of said coils providing motive action to said rotor when a control current is suppliied to said one coil, another of said coils providing output currents proportional to said rotor motive action, said flux generating means and flux return means being spaced apart for receiving said rotor coils, said rotor being free from any flux generating means.

3. A position detector and torque motor comprising stator means having flux generating means associated with a flux return means, a rotor comprising coils positioned to pass through any flux developed by said flux generating means, one of said coils providing motive action to said rotor when a control current is supplied to said one coil, another of said coils providing output currents proportional to said rotor motive action, said flux generating means and flux return means being spaced apart for receiving said rotor coils, and a gimbal supported gyro means associated with said rotor for rendering said rotor free from external effected mechanical displacements through said gimbal.

4. A position detector and torque motor comprising stator means having flux generating means associated with a flux return means, a rotor comprising coils positioned to pass through any flux developed by said flux generating means, one of said coils providing motive action to said rotor when a control current is supplied to said one coil, another of said coils providing output currents proportional to said rotor motive action, said motive action coil and said output current producing coil being positioned in separated stator associated flux generating means.

5. A position detector and torque motor comprising stator means having flux generating means associated with a flux return means, a rotor comprising coils positioned to pass through any flux developed by said flux generating means, one of said coils providing motive action to said rotor when a control current is supplied to said one coil, another of said coils providing output currents proportional to said rotor motive action, said motive action coil and said output current producing coil being positioned in separated stator associated flux generating means, one of said separated stator associated flux generating means comprising a permanent magnet flux producing member while the other flux generating means comprises an electromagnet.

6. A position detector and torque motor comprising stator means having flux generating means associated with a flux return means, a rotor comprising coils positioned to pass through any flux developed by said flux generating means, one of said coils providing motive action to said rotor when a control current is supplied to said one coil, another of said coils providing output currents proportional to said rotor motive action, said coils being positioned within a single stator means flux generating means.

7. A position detector and torque motor comprising stator means having flux generating means associated with a flux return means, a rotor comprising coils positioned to pass through any flux developed by said flux generating means, one of said coils providing motive action to said rotor when a control current is supplied to said one coil, another of said coils providing output currents proportional to said rotor motive action, said coils being positioned within a single stator means flux generating means, one of said rotor coils providing torque to said rotor in response to current passage through said one coil while the coil is within said flux generating means.

8. A position detector and torque motor comprising stator means having flux generating means associated with a flux return means, a rotor comprising coils positioned to pass through any flux developed by said flux generating means, one of said coils providing motive action to said rotor when a control current is supplied to said one coil, another of said coils providing output currents proportional to said rotor motive action, said coils being positioned within a single stator means flux generating means, one of said rotor coils providing torque to said rotor in response to current passage through said one coil while the coil is within said flux generating means, the other of said coils providing output currents which are proportional to the flux generating means flux linked by said other coil.

9. A positions detector and torque motor comprising stator means having flux generating means associated with a flux return means, a rotor comprising coils positioned to pass through any flux developed by said flux generating means, one of said coils providing motive action to said rotor when a control current is supplied to said one coil, another of said coils providing output currents proportional to said rotor motive action, said motive action coil and said output current producing coil being positioned in separated stator associated flux generating means, one of said separated stator associated flux generating means comprising a permanent magnet flux producing member while the other flux generating means comprises an electromagnet, said coils being supported on non-magnetic light weight coil support forms.

10. An electromagnetic device comprising stator means having flux generating means and flux low impedance return means, a rate input means, a gimbal supporting said rate input means, bifilar coils supported on said gimbal in a position to pass through any flux developed by said flux generating means, one winding in each of said bifilar coils providing motive action displacement to said gimbal in response to an input signal, the other winding of each of said bifilar coils providing output signals substantially proportional to said gimbal motive action displacement.

11. An accelerometer comprising stator means having flux generating means and flux low impedance return means, a gyro, a gimbal supporting said gyro, coils secured to said gimbal in position to pass through any flux developed by said flux generating means, one of said coils providing motive action to said gimbal in response to an input signal, another of said coils providing output signals proportional to said gimbal motive action, and gyro displacement of said another of said coils for producing output signals proportional to said gyro displacement.

12. An accelerometer comprising stator means having flux generating means and flux low impedance return path means, a gyro, gimbal means for supporting said gyro, a plurality of coils supported on said gimbal means in position to pass through flux developed by said flux generating means, one of said plurality of coils providing a force for displacing said gyro from its plane of rotation and another of said coils providing an output current proportional to the rate of displacement of said gyro from its plane of rotation, said stator being at times displaced about said gyro to provide additional output current from said another coil.

References Cited in the file of this patent

UNITED STATES PATENTS

| | | |
|---|---|---|
| 1,796,556 | Boitel | Mar. 17, 1931 |
| 2,752,791 | Jarosh et al. | July 3, 1956 |
| 2,878,006 | Sedgfield et al. | Mar. 17, 1959 |

FOREIGN PATENTS

| | | |
|---|---|---|
| 123,423 | Australia | Jan. 24 1947 |